United States Patent [19]

Schweikert et al.

[11] Patent Number: 4,893,217
[45] Date of Patent: Jan. 9, 1990

[54] ALUMINUM ELECTROLYTE CAPACITOR

[75] Inventors: Wilhelm Schweikert, Heidenheim-Mergelst; Wilhelm Lauer, Giengen-Huerben, both of Fed. Rep. of Germany

[73] Assignee: Siemens Aktiengesellschaft, Berlin and Munich, Fed. Rep. of Germany

[21] Appl. No.: 276,367

[22] Filed: Nov. 25, 1988

[30] Foreign Application Priority Data

Dec. 22, 1987 [DE] Fed. Rep. of Germany ....... 3743629

[51] Int. Cl.$^4$ ............................................. H01G 9/00
[52] U.S. Cl. ................................................... 361/506
[58] Field of Search ............... 106/466, 470, 482, 490; 361/500–541

[56] References Cited

U.S. PATENT DOCUMENTS

| | | | |
|---|---|---|---|
| 2,285,136 | 6/1942 | Abendroth | 361/538 |
| 2,862,155 | 11/1958 | Bubriski | 361/535 |
| 2,926,109 | 2/1960 | Lilienfeld | 361/530 X |
| 2,965,816 | 12/1960 | Ross | 361/505 |
| 4,273,589 | 6/1981 | Nauroth et al. | 106/482 X |
| 4,447,346 | 5/1984 | MacNamee et al. | 361/505 X |
| 4,760,494 | 7/1988 | Crum | 361/517 X |

FOREIGN PATENT DOCUMENTS

| | | |
|---|---|---|
| 1108810 | 6/1961 | Fed. Rep. of Germany . |
| 1252804 | 10/1967 | Fed. Rep. of Germany . |
| 2285569 | 4/1976 | France . |
| 1069685 | 5/1967 | United Kingdom . |
| 1513147 | 6/1978 | United Kingdom . |

Primary Examiner—Donald A. Griffin
Attorney, Agent, or Firm—Hill, Van Santen, Steadman & Simpson

[57] ABSTRACT

An aluminum electrolyte capacitor having a liquid operating electrolyte that contains combustible constituents is integrated in a housing. An absorbent mass that is pourable and only partially fills the empty volume of the housing is contained in the housing.

7 Claims, No Drawings

ALUMINUM ELECTROLYTE CAPACITOR

BACKGROUND OF THE INVENTION

The present invention is directed to an aluminum electrolyte capacitor that is composed of two layers of aluminum foil wound with one another. The anode foil thereof is provided with an oxide layer that acts as a dielectric, and spacers are arranged between the foils and are saturated with a liquid operating electrolyte that contains combustible constituents. The aluminum electrolyte capacitor is integrated in a housing and an absorbent mass that bonds the electrolyte emerging from the winding is contained in the housing.

When electrolyte capacitors are used that include an operating electrolyte containing combustible constituents in areas in which there is a risk of fire and explosion, for example in mining, ther is a danger. These combustible constituents can include, for example, ethyleneglycol, and free electrolytes cannot be excluded even though they may only be present in limited quantities at times. For this reason, such electrolyte capacitors have previously not been capable of being utilized in such environments.

Given tantalum electrolyte capacitors that comprise a liquid operating electrolyte of sulfuric acid, DE-AS 11 08 810 discloses that this capacitor be integrated in an external housing and the interspace between the inner and outer housing are completely filled out with an absorbent mass. The absorbent mass contains additives that react with the electrolyte to form neutrally reacting substances without the formation of gas. What this is thereby intended to avoid is that the "non-combustible" sulfuric acid escapes into the environment when the inner housing loses its seal, for whatever reasons.

Because these capacitors contain a relatively great quantity of liquid operating electrolyte, it is necessary to fill the entire empty volume between the inner an outer housing with the absorbent mass. It is further necessary to provide an adequately large empty volume. Accordingly, these capacitors are therefore significantly large than they typically wound be based on the electrical values, so that the volume capacitance is considerably reduced. Moreover, due to the large empty volume that must be filled with the absorbent mass, the manufacturing costs of these capacitors is more expensive.

SUMMARY OF THE INVENTION

The present invention provides an aluminum electrolyte capacitor that, in an economic manner, prevents the electrolytes from flowing out of the capacitor if there is a malfunction. To this end, an aluminum electrolyte capacitor is provided that is composed of two layers of aluminum foils wound with one another. The anode foil thereof is provided with an oxide layer that acts as a dielectric. Spacers that are saturated with a liquid operating electrolyte that contains combustible constituents are arranged between the foils. The aluminum electrolyte capacitor is integrated in a housing, and an absorbent mass that bonds electrolyte emerging from the winding is contained in the housing. The absorbent mass is pourable and only partially fills the empty volume of the housing.

In an embodiment of the present invention, the absorbent mass is composed of a compound chosen from the group consisting of: silicic acid; diatomaceous earth; and hydrargillite ($Al(OH)_3$).

In an embodiment of the present invention, approximately 25 to about 50 percent by volume of the empty volume is filled with the absorbent mass.

Additional features and advantages of the present invention will be apparent from the detailed description of the presently preferred embodiments.

DETAILED DESCRIPTION OF THE PRESENTLY PREFERRED EMBODIMENTS

The present invention provides an aluminum electrolyte capacitor that economically prevents the flow-out of electrolyte in the event of a malfunction. The flow-out of electrolyte is prevented by an absorbent mass that is pourable and only partially fills the empty volume of the capacitor.

In a preferred embodiment of the present invention, the absorbent mass is composed of silicic acid, diatomaceous earth, or hydrargillite ($Al(OH)_3$). In a preferred embodiment, approximately 25 to about 50 percent by volume of the empty volume of the capacitor is filled with the pourable absorbent mass.

Due to the nature of the liquid operating electrolytes of the capacitor, it is essentially all of the electrolyte that is contained in the spacers arranged between the aluminum foils. Particularly, if there is a malfunction, there is a risk that electrolyte can emerge from the winding.

The use of an absorbent, pourable mass, such as that of the present invention, provides the advantage that the absorbent material trickles down to the lowest location, i.e., to the potentially free electrolyte. This results in an advantage in that the entire empty volume need not be filled with an absorbent mass. Thus, the present invention provides an absorbent mass that does not have to fill the entire empty volume of the capacitor to prevent a flow out of electrolyte.

The absorbent mass of the present invention, which is positioned to bond free electrolyte emerging from the winding during the service life of the capacitor given adequate purity, is, in a preferred embodiment, composed of silicic acid that is produced from $SiCl_4$ by oxyhydrogen/hydrolysis. This silicic acid is commercially available under the trade name "Aerosil".

Due to its construction, the capacitor of the present invention is suitable for utilization in areas that are subject to a risk of fire or explosion, such as, mining operations.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

We claim:

1. An aluminum electrolyte capacitor comprising two layers of aluminum foils would with one another, the anode foil thereof being provided with an oxide layer acting as dielectric, spacers that are saturated with a liquid operating electrolyte that contains combustible constituents are arranged between the foils, the aluminum electrolyte capacitor is integrated in a housing, and an absorbent mass that bonds electrolyte emerging from the winding is contained in the housing, the absorbent mass being pourable and only partially filling an empty volume of the housing.

2. The aluminum electrolyte capacitor of claim 1 wherein the absorbent mass is composed of a compound chosen from the group consisting of silicic acid, diatomaceous earth, and hydrargillite (Al(OH)$_3$).

3. The aluminum electrolyte capacitor of claim 2 wherein approximately 25 to about 50 percent by volume of the empty volume is filled with the pourable absorbent mass.

4. The aluminum electrolyte capacitor of claim 1 wherein approximately 25 to about 50 percent by volume of the empty volume is filled with the pourable absorbent mass.

5. An aluminum electrolyte capacitor comprising:
two layers of aluminum foils would with one another;
spacers that are saturated with a liquid operating electrolyte containing combustible constituents are located between the foils;
the aluminum electrolyte capacitor being integrated in a housing having an empty volume; and
an absorbent mass for binding electrolyte that emerges from the winding is located in the housing, the absorbent mass filling approximately 25 to about 50 percent by volume of the empty volume of the housing.

6. The aluminum electrolyte capacitor of claim 5 wherein the absorbent mass is composed of a compound chosen from the group consisting of silicic acid, diatomaceous earth, and hydrargillite (Al(OH)$_3$).

7. An aluminum electrolyte capacitor comprising two layers of aluminum foils wound with one another, the anode foil thereof being provided with an oxide layer acting as dielectric, spacers that are saturated with a liquid operating electrolyte that contains combustible constituents are arranged between the foils, the aluminum electrolyte capacitor is integrated in a housing, and an absorbent mass that bonds electrolyte emerging from the winding is contained in the housing, the absorbent mass being pourable and only filling approximately 25 to about 50 percent by volume of an empty volume of the housing, the absorbent mass being constructed from silicic acid.

* * * * *